United States Patent
Smith et al.

(10) Patent No.: US 9,747,363 B1
(45) Date of Patent: Aug. 29, 2017

(54) EFFICIENT STORAGE AND RETRIEVAL OF SPARSE ARRAYS OF IDENTIFIER-VALUE PAIRS

(75) Inventors: Timothy Smith, Waltham, MA (US); Gabi Steinberg, Carlisle, MA (US)

(73) Assignee: ATTIVIO, INC., Newton, MA (US)

( * ) Notice: Subject to any disclaimer, the term of this patent is extended or adjusted under 35 U.S.C. 154(b) by 123 days.

(21) Appl. No.: 13/410,274

(22) Filed: Mar. 1, 2012

(51) Int. Cl.
*G06F 17/30* (2006.01)

(52) U.S. Cl.
CPC .. *G06F 17/30622* (2013.01); *G06F 17/30324* (2013.01); *G06F 2212/1044* (2013.01)

(58) Field of Classification Search
CPC ....... G06F 17/30622; G06F 2212/1044; G06F 17/30613; G06F 17/30336; G06F 17/30321; G06F 12/00; G06F 12/06; G06F 12/0223; G06F 17/30592; G06F 15/8053; G06F 15/8061; G06F 15/8069; G06F 15/8076; G06F 15/8084; G06F 15/8092; G06F 9/5016; G06F 12/02; G06F 17/30955; G06F 3/064; G06F 2212/454; G06F 12/0207; G06F 17/30946; G06F 12/0615; G06F 12/04; G06F 17/16; G06F 17/30324; H03M 7/4093; H03M 7/46; H03M 7/3066; H03M 7/3086; H03M 7/4056; H03M 7/4087; H03M 7/4081; H03M 7/4031
See application file for complete search history.

(56) References Cited

U.S. PATENT DOCUMENTS

| | | | |
|---|---|---|---|
| 4,606,002 A * | 8/1986 | Waisman et al. | |
| 4,803,651 A | 2/1989 | Galkowski | |
| 5,010,478 A * | 4/1991 | Deran | |
| 5,295,261 A | 3/1994 | Simonetti | |
| 5,592,665 A | 1/1997 | Lahaije | |
| 5,594,898 A | 1/1997 | Dalal et al. | |
| 5,649,181 A | 7/1997 | French et al. | |
| 5,734,887 A | 3/1998 | Kingberg et al. | |

(Continued)

FOREIGN PATENT DOCUMENTS

WO 2004/095428 A2 11/2004

OTHER PUBLICATIONS

Ding, Shuai, Josh Attenberg, and Torsten Suel. "Scalable techniques for document identifier assignment ininverted indexes." In Proceedings of the 19th international conference on World wide web, pp. 311-320. ACM, 2010.*

(Continued)

*Primary Examiner* — Alford Kindred
*Assistant Examiner* — Jesse P Frumkin
(74) *Attorney, Agent, or Firm* — Patent GC LLC (57) ABSTRACT

Some computer applications, such as database applications, generate sparse arrays that map identifiers to field values. To reduce memory usage, only those blocks of the array with non-empty entries are stored, and only the entries between and including the first non-empty entry and the last non-empty entry are stored. The offset and length of this range of non-empty entries is stored. To retrieve a value for an entry of the array, it is determined whether the entry is in an empty block or a non-empty block. If the entry is in an empty block, a null value is returned for the entry. If the entry is not in the stored range of entries for a non-empty block, a null value is returned for the entry. Otherwise, the value stored in the block for that entry is returned.

22 Claims, 5 Drawing Sheets

(56) References Cited

U.S. PATENT DOCUMENTS

| | | | |
|---|---|---|---|
| 5,748,952 A | | 5/1998 | Chadha et al. |
| 5,758,145 A | | 5/1998 | Bhargava et al. |
| 5,794,229 A | | 8/1998 | French et al. |
| 5,845,274 A | | 12/1998 | Chadha et al. |
| 5,845,296 A | * | 12/1998 | Jasuja ................ G06F 12/0223 |
| 5,857,196 A | * | 1/1999 | Angle et al. |
| 5,860,136 A | | 1/1999 | Fenner |
| 5,918,225 A | | 6/1999 | White et al. |
| 5,943,665 A | | 8/1999 | Guha |
| 5,987,453 A | | 11/1999 | Krishna et al. |
| 6,175,835 B1 | | 1/2001 | Shadmon |
| 6,199,141 B1 | * | 3/2001 | Weinreb et al. ............ 711/118 |
| 6,226,728 B1 | * | 5/2001 | See et al. ................ 711/171 |
| 6,349,308 B1 | * | 2/2002 | Whang et al. |
| 6,460,047 B1 | * | 10/2002 | Ambroziak |
| 6,499,033 B1 | | 12/2002 | Vagnozzi |
| 6,546,391 B1 | | 4/2003 | Tsuruoka |
| 6,665,640 B1 | | 12/2003 | Bennett et al. |
| 6,718,320 B1 | | 4/2004 | Subramanian et al. |
| 6,810,445 B1 | * | 10/2004 | Sato et al. ................ 710/33 |
| 6,895,418 B1 | * | 5/2005 | Crow et al. |
| 6,957,210 B1 | | 10/2005 | Ramesh |
| 6,957,222 B1 | | 10/2005 | Ramesh |
| 7,092,954 B1 | | 8/2006 | Ramesh |
| 7,133,885 B2 | * | 11/2006 | Hollines et al. |
| 7,328,204 B2 | * | 2/2008 | Coady .................... 707/748 |
| 7,353,350 B2 | | 4/2008 | Klassen et al. |
| 7,475,058 B2 | | 1/2009 | Kakivaya et al. |
| 7,546,306 B2 | | 6/2009 | Faerber et al. |
| 7,689,553 B2 | | 3/2010 | Zuzarte |
| 7,702,616 B1 | | 4/2010 | Li et al. |
| 7,720,838 B1 | | 5/2010 | Li et al. |
| 7,885,967 B2 | * | 2/2011 | Schneider .............. 707/756 |
| 8,073,840 B2 | | 12/2011 | Smith et al. |
| 8,229,902 B2 | * | 7/2012 | Vishniac et al. .......... 707/693 |
| 2001/0034822 A1 | * | 10/2001 | Weinreb et al. .......... 711/203 |
| 2001/0054034 A1 | | 12/2001 | Arning et al. |
| 2003/0135495 A1 | | 7/2003 | Vagnozzi |
| 2004/0117595 A1 | * | 6/2004 | Norris et al. ............ 711/214 |
| 2007/0174577 A1 | * | 7/2007 | Moir .................. G06F 12/0646 711/170 |
| 2007/0192306 A1 | | 8/2007 | Papakonstantinou et al. |
| 2007/0260628 A1 | | 11/2007 | Fuchs et al. |
| 2008/0077570 A1 | | 3/2008 | Tang et al. |
| 2008/0091691 A1 | | 4/2008 | Tsuji |
| 2008/0243860 A1 | * | 10/2008 | Cannon et al. ............ 707/10 |
| 2008/0313184 A1 | * | 12/2008 | Li et al. ................ 707/7 |
| 2008/0313213 A1 | * | 12/2008 | Zhang et al. ............ 707/102 |
| 2009/0106210 A1 | * | 4/2009 | Slezak et al. ............ 707/3 |
| 2011/0010347 A1 | * | 1/2011 | Cheriton et al. .......... 707/692 |
| 2011/0055192 A1 | | 3/2011 | Tang et al. |
| 2011/0320446 A1 | * | 12/2011 | Chakrabarti et al. ...... 707/737 |
| 2012/0249560 A1 | * | 10/2012 | Dickenson .............. 345/505 |
| 2013/0275699 A1 | * | 10/2013 | Cheriton ................ 711/162 |
| 2015/0194213 A1 | * | 7/2015 | Cheriton .......... G06F 12/0223 711/108 |

OTHER PUBLICATIONS

Roper, MI, Wallis, GD. "Transaction Management for Multi-Media Communication". Jun. 1, 1993 TDB v36 n6A 06-93 p. 227-228 IP.com No. IPCOM000104866D IP.com Electronic Publication Date: Mar. 19, 2005.*

Agrawal et al., "DBXplorer: A System for Keyword-Based Search over Relational Databases", Proceedings of the 18 th International Conference on Data Engineering, 2002, 12 pages.

Hristidis et al., "Discover: Keyword Search in Relational Databases", Proceedings of the 28th VLDB Conference 2002, pp. 1-12.

Arnold, S. E., "Attivio, An Interview with Ali Riaz", May 26, 2008, Retrieved from internet on Apr. 20, 2012, 6 pages, available at: http://arnoldit.com/search-wizards-speak/attivio.html.

Arnold, S. E., "Beyond Search, News and Information from ArnoldIT.com about search and content Processing . . . ", May 27, 2008, Retrieved from internet on Apr. 20, 2012, 6 pages, available at: http://arnoldit.com/wordpress/2008/05/23/attivio-interview-runs-on-may-27-2008/.

International Search Report and Written Opinion received for PCT Patent Application No. PCT/US2009/003609, mailed on Sep. 17, 2009, 11 pages.

International Preliminary Report on Patentability received for PCT Patent Application No. PCT/US2009/003609, mailed on Dec. 29, 2010, 9 pages.

Non Final Office Action received for U.S. Appl. No. 12/456,430, mailed on May 18, 2011, 14 pages.

Notice of Allowance received for U.S. Appl. No. 12/456,430, mailed on Sep. 21, 2011, 7 pages.

"Using Sparse Columns: SQL Server 2008 R2", MSDN, Retrieved from Internet on 10/25/201, 8 pages, available at: http://msdn.microsoft.com/en-us/library/cc280604(d=printer).aspx.

"Constructing Sparse Matrices", Constructing Sparse Matrices :: Sparse Matrices (MATLAB®), Retrieved from Internet on Oct. 25, 2011, 4 pages, available at: http://www.mathworks.com/help/techdoc/math/f6-43072.html.

"Entity-attribute-value model", Wikipedia, the free encyclopedia, Retrieved from Internet on Oct. 25, 2011, 17 pages, available at: http://en.wikipedia.org/wiki/Entity-attribute-value_model.

Dahlke, et al., "Sparse Representations and Efficient Sensing of Data", Report from Dagstuhl Seminar 11051, vol. 1, No. 1, Jan.-Feb. 4, 2011, pp. 108-127.

Beckmann, et al., "Extending RDBMSs to Support Sparse Datasets Using an Interpreted Attribute Storage Format", Data Engineering, ICDE '06. Proceedings of the 22nd International Conference on Apr. 3-7, 2006, 10 pages.

Abadi, J. Daniel, "Column Stores for Wide and Sparse Data", 3rd Biennial Conference on Innovative Data Systems Research (CIDR), Jan. 7-10, 2007, 6 pages.

"Sparse arrays: About sparse arrays", Jul. 2, 2012, 29 pages.

"Sparse Arrays: Manipulating Lists—Wolfram Mathematica 8 Documentation", Retrieved from Internet on Nov. 9, 2011, 4 pages, available at: http://reference.wolfratm.com/mathematica/tutorial/SparseArrays-ManipulatingLists.html.

"Simple-2-dimensional-sparse-array—The Chicken Scheme wiki", Retrieved from Internet on Nov. 9, 2011, 1 page, available at: http://wiki.call-cc.org/simple-2-dimensional-sparse-array.

"Sparse Arrays—Using IDL: Mathematics", IDL Online Help, Mar. 6, 2007, Retrieved from Internet on Nov. 9, 2011, 3 pages, available at: http://idlastro.gsfc.nasa.gov/idl_html_help/Sparse_Arrays.html.

"Sparse Array KHR extension", Sparse Array KHR extension—Collada , Oct. 29, 2011, Retrieved from Internet on Nov. 9, 2011, 6 pages, available at: https://collada.org/mediawiki/index.php/Sparse_Array_KHR_extension.

"Sparse array", Sparse array—Wikipedia, the free encyclopedia, Retrieved from Internet on Nov. 9, 2011, 2 pages, available at: http://en.wikipedia.org/wiki/Sparse_array.

"How Space-Efficient Are Sparse Arrays?", Dan Ellard, EDT 1997, Retrieved from Internet on Nov. 9, 2011, 1 page, available at: http://www.eecs.harvard.edu/~ellard/Q-97/HTML/root/node13.html.

"An Implementation", Dan Ellard, EDT 1997, Retrieved from Internet on Nov. 9, 2011, 3 pages, available at: http://www.eecs.harvard.edu/~ellard/Q-97/HTML/root/node12.html.

"Linked List Representation", Dan Ellard, EDT 1997, Retrieved from Internet on Nov. 9, 2011, 2 pages, available at: http://www.eecs.harvard.edu/~ellard/Q-97/HTML/root/node11.html.

* cited by examiner

EFFICIENT STORAGE AND RETRIEVAL OF SPARSE ARRAYS OF IDENTIFIER-VALUE PAIRS

BACKGROUND

It is common in large database systems, and other computer systems that handle large amounts of multidimensional data, to store indexes and other data structures as arrays of related values. For example, an array can map values contained in or related to one or more objects, such as field values for documents or files, to identifiers of the objects related to or containing those values. As another example, an array can map object identifiers to the field values associated with those objects.

It is common that arrays of this sort are both large and "sparse," in that there are often many null values. Representing such an array in memory or storage consumes significant memory resources. Thus a variety of techniques have been used to represent sparse arrays. Many sparse array implementations are designed to optimize storage utilization for a specific problem area, not access times.

SUMMARY

In some database applications, a sparse array can, in practice, present a wide range of sparseness. Further, the storage utilization for the array needs to be balanced against the need for consistently fast access to data, especially for large data sets. A constant, fast access time, regardless of the number of items in the array, is preferable in order for a system to be scalable.

For example, in United States Patent Publication 2010/0005054, data called a "join mapping," which maps field values to document identifiers, is stored in a memory. An array that maps document identifiers to their field values also can be stored in the memory. This array is generated, given a field value-document identifier pair, by inserting the field value in the index at the Nth location of the array, where N is the document identifier. This array is often sparse.

Such an array, which maps document identifiers to field values, is commonly used for applications where fast access to the field values corresponding to document identifiers is desired. Such an application can include various operations, such as a sort of documents, given their document identifiers, on their field values. For example, given a set of one million document identifiers, to be sorted on their date of publication, the dates of publication need to be quickly accessed using the document identifiers. This array can be used for such an operation.

In such applications, fast access to the document identifier-to-field value array is desirable. But, using a large amount of memory to store the array negatively impacts system performance. Further, there can be a large variability in the sparseness of the data in the array. The data also tends to be clustered in the memory. However, conventional techniques for representing a sparse array, such as a balanced binary tree or hash table, result in slower than desirable access times.

To reduce the amount of memory used for storage, yet provide fast and constant access time, regardless of the size of the array, only portions, such as blocks, of the array with non-empty entries are stored. And, for each portion of the array that is stored, only the entries between and including the first non-empty entry and the last non-empty entry in that portion are stored. An offset of this range of entries from a reference (such as the beginning of the array or the beginning of a portion of the array), and data indicating the length of this range of non-empty entries, are stored but the preceding and following empty entries from that portion of the array are not stored.

In one implementation using blocks, the array is represented by an array of block pointers (indicating the location in memory of the data for each non-empty block), with a null pointer for each empty block. Each block contains a range of entries and data defining the offset and length of the block. For example, with a sparse array of a positive integer number N of entries, each entry may have data or may be null. The array is represented by a set of M blocks, where M is a positive number, the result of dividing N by a block size defined by a number K of entries. Thus, as an illustrative example only, if N is 40000, and K is 1000 then M is 40.

To retrieve a value for an entry of the array, it is determined whether the entry is in an empty block or a non-empty block. In particular, the array of block pointers is accessed for the block containing the given entry. If the array of block pointers returns null, then the entry is in an empty block, and a null value is returned for the entry. If the entry is not in the stored range of entries for the block, then a null value is returned for the entry. Otherwise, the value stored in the block for that entry is returned as the value for that entry. This value still can be null, but is nonetheless read from the array.

DETAILED DESCRIPTION

The following section provides an example operating environment in which sparse arrays can be implemented. While the following example is based on processing join mappings in a database query, other applications that use sparse arrays also can take advantage of the implementation described herein.

Figure 1:
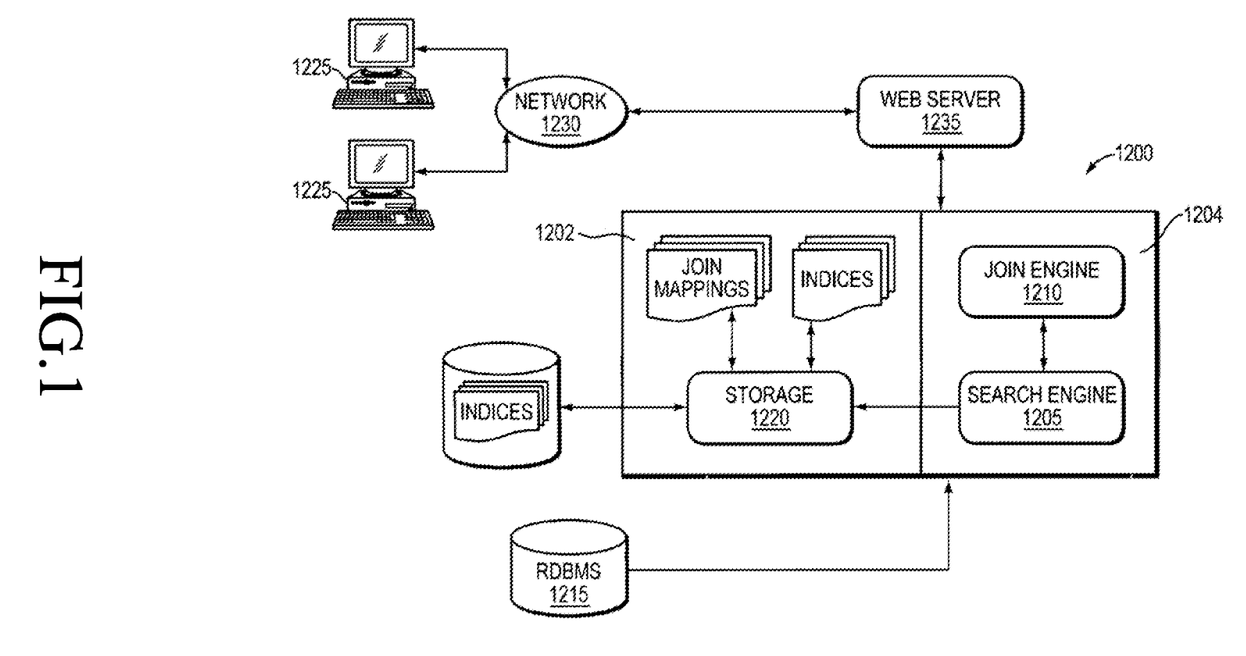
FIG. 1 is a block diagram of a system that generates sparse arrays.

Referring to FIG. 1, a computer system for querying join data using an index is shown. Such a system is described in detail in U.S. Patent Publication 2010/0005054 which is hereby incorporated by reference.

FIG. 1 illustrates a system 1200 for querying joined data using an index. The system includes both a storage apparatus 1202 and a processing apparatus 1204. The processing apparatus 1104 includes both a join engine 1210 and search engine 1205. The processing apparatus 1104 provides the functional operations of system 1200, including the creation of search-engine indices and join mappings, and the processing of search engine queries against the indices. The storage apparatus 1102 includes storage 1220 that provides storage (volatile and non-volatile) for indices and documents.

The search engine 1205, which executes in main memory, receives queries and instructions from join engine 1210, retrieves record-based data from tables in a relational database management system (RDBMS) 1215, and creates search-engine indices as described above. For each table associated with a join query, the search engine 1205 creates both a search-engine index having a document identifier and a foreign key, and a document that includes the corresponding document identifier from the search-engine index and the rest of the non-key data from the corresponding record. The join engine 1210 receives requests from users (which, in many cases, will require data from multiple tables), queries the search engine 1205 to return primary and secondary result sets for primary and secondary queries parsed from the join query. The join engine 1210 queries the search engine 1205 to provide join mappings to storage based on the parsed queries. Using the join mappings, the join engine 1210, identifies documents from the primary result sets and the secondary result sets that have common field values. The search engine 1205 may then retrieve the identified documents from the RDBMS 1215.

Storage 1220 may manage the storage of indices and join mappings. For example, storage 1220 may determine that certain indices are large and accessed infrequently, and therefore are better placed on disk, whereas other indices and/or join mappings may benefit from being placed in volatile memory (e.g., RAM) for quicker and more frequent usage.

Join engine 1210 may use the join mappings to identify a field on which a join is performed. Further, the join engine 1210 may use the join mappings to identify values for fields relative to documents. Alternatively, the join engine 1210 may use the join mappings to identify documents relative to values for fields.

Join engine 1210 may also compute a combined score for all identified documents and associated "child" documents. Join engine 1210 may also rank the identified documents according to the combined scores. Join engine 1210 may then query the search engine 1205 to retrieve the identified documents from the RDBMS 1135 and present them to a user in a list organized by the rank of each document.

In practice, the system 1200 may be implemented as part of or a module within a larger application, including, for example, web-based applications that utilize conventional search engine interfaces. In such instances, multiple clients 1225 submit queries over a network 1230. The queries are received at a web server 1235, and passed on to the system 1200 for processing. Results may then be integrated into other application pages as presented to the clients 1225.

The clients 1225 may be implemented as software running on a personal computer (e.g., a PC with an INTEL processor or an APPLE MACINTOSH processor) capable of running such operating systems as the MICROSOFT WINDOWS family of operating systems from Microsoft Corporation of Redmond, Wash., the MAC OS operating system from Apple Computer of Cupertino, Calif., and various varieties of Unix, such as SUN SOLARIS from SUN MICROSYSTEMS, and GNU/Linux from RED HAT, INC. of Durham, N.C. (and others). The clients 1195 may also be implemented on such hardware devices as a terminal, network computer, set top box, game player, mobile device, wireless device, personal digital assistant, media (e.g., music and/or video) player, information appliance, workstation, minicomputer, mainframe computer, or any other device with computing functionality.

The network 1230 connecting the clients to the system 1200 may include any media such as standard telephone lines, LAN or WAN links (e.g., T1, T3, 56 kb, X.25), broadband connections (ISDN, Frame Relay, ATM), wireless links (802.11, bluetooth, etc.), and so on, in any suitable combination. Preferably, the network 1230 can carry TCP/IP protocol communications, and HTTP/HTTPS requests made by the clients 1225 may be communicated over such TCP/IP networks. The type of network is not a limitation, however, and any suitable network may be used. Non-limiting examples of networks that can serve as or be part of the communications network 1230 include a wireless or wired Ethernet-based intranet, a local or wide-area network (LAN or WAN), and/or the global communications network known as the Internet, which may accommodate many different communications media and protocols.

Examples of the RDBMS 1215 that may be used to support the system 1200 include the MySQL Database Server by Sun Microsystems, the ORACLE Database Server, or the SQLServer Database Server by Microsoft.

Given this context, an example implementation of a sparse array will be described in more detail in connection with FIGS. 2-5. This implementation of a sparse array can be applied to a document identifier-to-field value mapping such used in the system shown in FIG. 1, so as to improve memory usage and performance in such a system.

Figure 2:
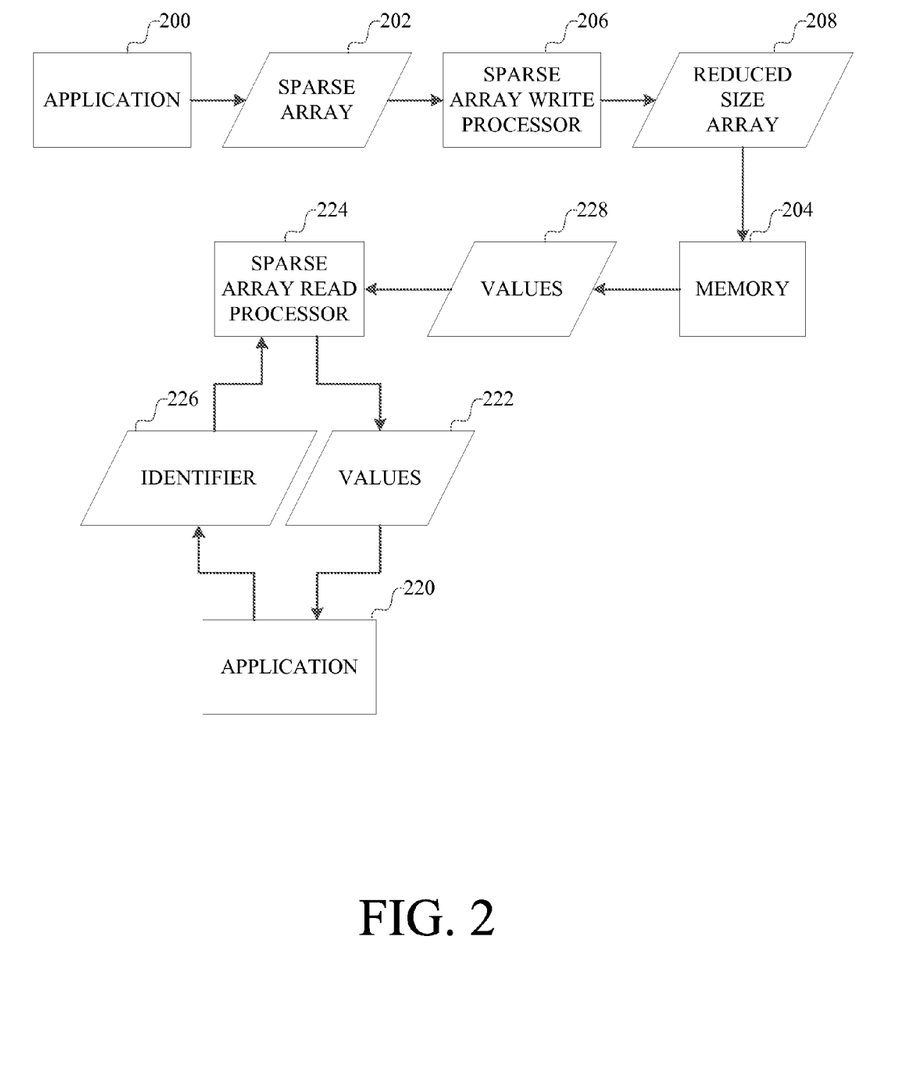
FIG. 2 is a data flow diagram illustrating an example implementation of storing and retrieving data in sparse arrays.

In FIG. 2, a dataflow diagram of the use of the sparse array will now be described. An application 200 generates an array 202, from which data is stored in memory 204. Because the array is sparse, it is reduced in size by a sparse array write processor 206, to generate the reduced size join mapping 208, which contains the data stored in the memory 204.

Other applications 220 use values 222 from the memory 204. In particular a sparse array read processor 224, given an identifier 226 reads values 228 from the memory 204. The identifier is provided from the application 220, and the value 222 corresponding to this identifier is provided by the read processor 224 to the application 220.

To reduce the amount of memory used for storage of the array in memory 204, yet provide fast and constant access time regardless of the size of the array, only portions of the array with non-empty entries are stored. And, for each portion of the array that is stored, only the entries between and including the first non-empty entry and the last non-empty entry in that portion are stored. An offset of this range of entries from a reference (such as the beginning of the array or the beginning of a portion of the array), and data indicating the length of this range of non-empty entries, are stored but the preceding and following empty entries from that portion of the array are not stored.

Figure 3:
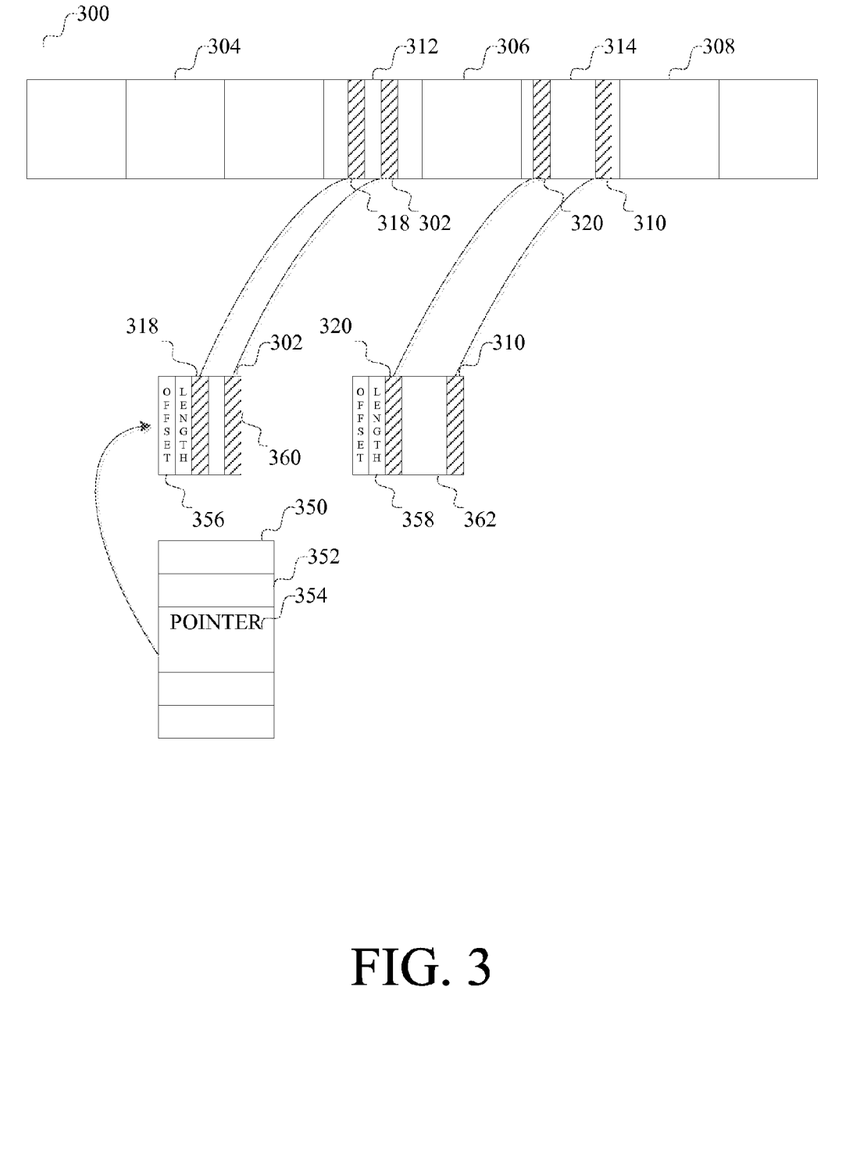
FIG. 3 is a diagram illustrating how a sparse array can be compressed for storage in memory.

Turning now to FIG. 3, an overview of a representation of a sparse array, where the portions of the array are blocks of the same size, will now be described by way of example. A sparse array is shown at 300, and has N entries, comprised of M blocks, with K entries per block. An entry, such as illustrated at 302, can be empty or non-empty. The entries shown at 302, 318, 310 and 320 are non-empty. Entries in blocks 304, 306 and 308 are illustrated as empty. Blocks 312 and 314 are illustrated as containing some empty entries and some non-empty entries (302 and 318, 310 and 320, respectively). Blocks 312 and 314 are the only blocks in the array 300 that are shown with non-empty entries to simplify illustration.

When the array is initialized in memory, an array of block pointers is allocated, all initially null. A block pointer is the location in memory for the data for a block. Each block is allocated in memory when a first entry is stored in that block, and its pointer in the array of block pointers is updated. When writing of data to the array has completed, empty blocks have a null block pointer; blocks with non-empty entries have a non-null block pointer.

After writing of data to the array has completed, it is then rearranged in the memory in reduced form. Only data from blocks have non-empty entries (e.g., block 312 and 314) are stored. Further, in reduced form, for each of these blocks, only the range of entries between the first non-empty entry (e.g., 318, 320) in the block through the last non-empty entry (e.g., 302, 310) in the block are stored, as shown at 360 and 362. In reduced form, the preceding empty entries in the block, and subsequent empty entries in the block, are not stored. An array 350 of block data is created using the array of block pointers describing the sparse array. Each entry 352 in the array 350 includes a pointer 354 for the data for the block in memory. Each block with non-empty entries also includes data describing the block associated with it, such as stored at the beginning of the block in memory. The data can include, for example, an offset from the beginning of the block 356, such as the number of empty entries preceding the stored portion of the block, and data 358 indicating the length of the non-empty portion of the block, such as the number of entries in this range.

To retrieve a value for an entry of the array, it is determined whether the entry is in an empty block or a non-empty block. In particular, the array 350 of block pointers is accessed for the block containing the given entry. If the array of block pointers returns null, then the entry is in an empty block, and a null value is returned for the entry. If the entry is not in the stored range of entries for the block, then a null value is returned for the entry. Otherwise, the value stored in the block for that entry is returned as the value for that entry. This value still can be null, but is nonetheless read from the array.

Having now provided a general overview of such sparse array reduction for caching, a specific example will now be described.

Figure 4:
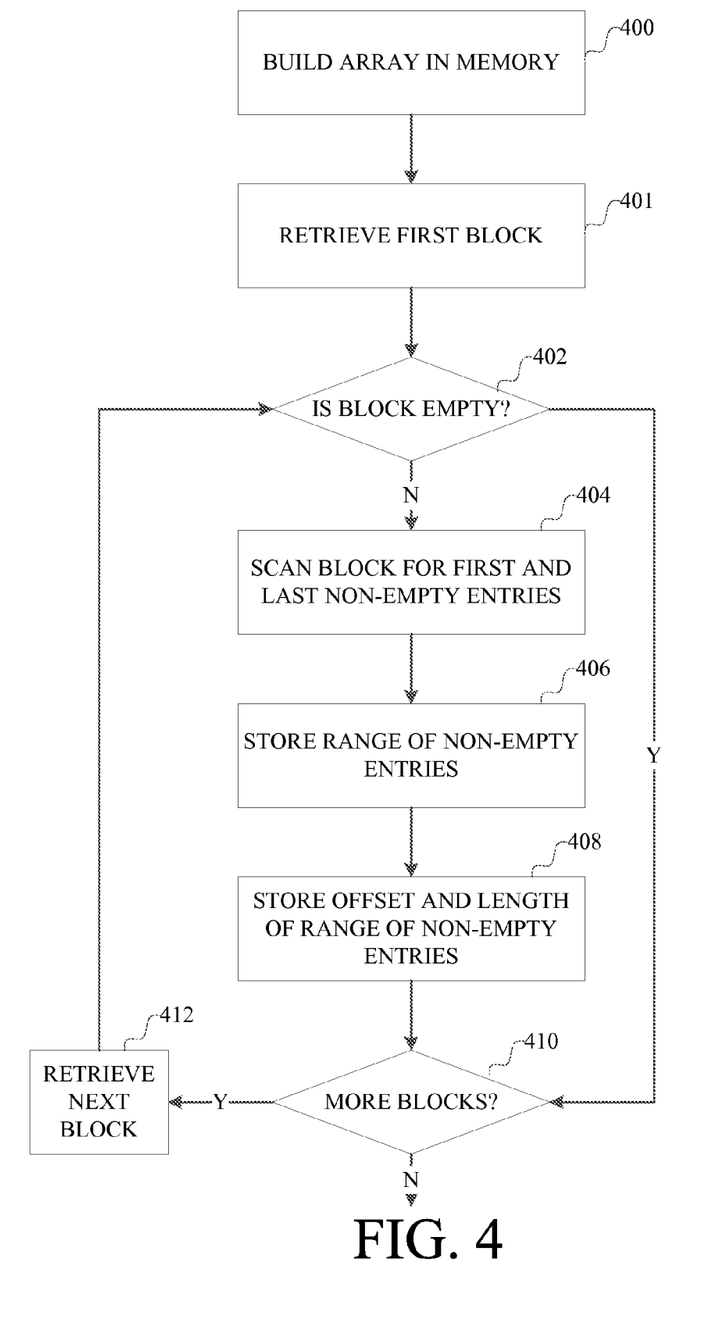
FIG. 4 is a flow chart describing an example implementation of writing a sparse array into memory in a reduced form.

FIG. 4 is a flow chart describing an example implementation of writing a sparse array into memory in a reduced form.

The sparse array is first built 400 in memory without reducing the size of the blocks. For example, if a mapping of value-to-identifier pairs is processed into an identifier-to-value mapping in an array, where there are N identifiers, then each value is written into its corresponding entry in an N-entry array. As noted above the sparse array can be represented by an array of block pointers, where a block pointer is the location in memory for the data for a block. Empty blocks have a null block pointer; blocks with non-empty entries have a non-null block pointer.

After building the array in memory, it is processed into a reduced form. In particular, the information about the first block is obtained 401 from the array of block pointers. If the block is non-empty, as determined at 402, then the block is scanned 404 to identify the first and last non-empty entries in the block. The range of entries between the first and last non-empty entries is stored 406 in the memory. The location in memory of this range of entries from the block is stored 408 in the array of block pointers; the data indicating the offset and length of this range of entries is stored with the block in memory. Other implementations can store other data indicating the offset and length of the range of blocks. After processing a non-empty block, or if a block is empty, if blocks remain to be processed (as determined at 410), then next block is obtained 412, and the process (402-410) repeats until all blocks are processed.

The process described in FIG. 4 involves reducing a sparse array, once created, into another form that takes up less memory space. This implementation is applicable for fixed size arrays with uniform block sizes.

It is possible, but less efficient, to implement the array with nonuniform block sizes so long as computation involved in determining the block in which an entry arises has a fixed cost.

If the amount of data in the array can change, then the reduced size implementation can be maintained dynamically. For example, when an entry is written to a block, and if the block is empty, then memory can be allocated for the block and the entry is stored, and its offset and length are stored. As more entries are added to a non-empty block, more memory can be allocated for the block and the offset and length of the range of entries in the block can be updated.

Having now described how the array is written to memory in reduced form, reading data from the reduced-size array will now be described.

Figure 5:
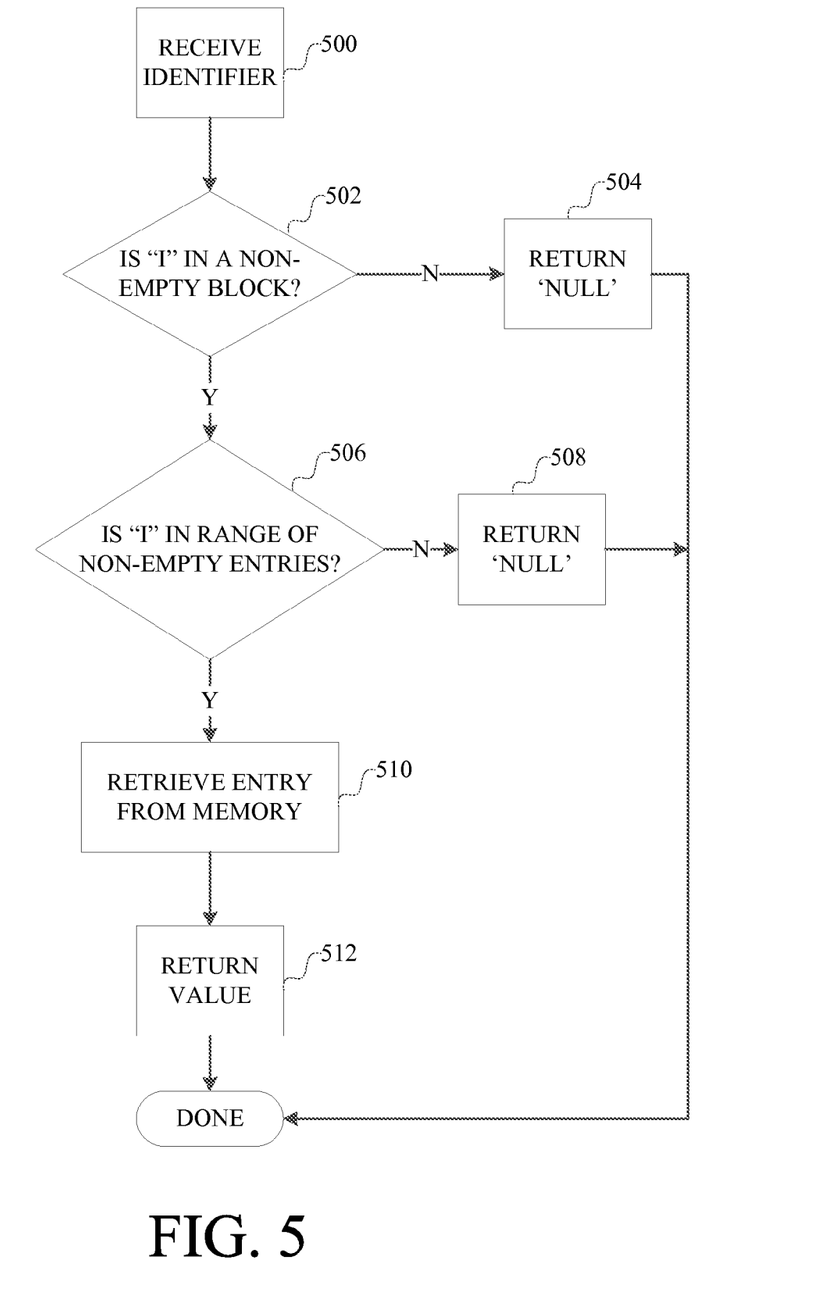
FIG. 5 is a flow chart describing an example implementation of reading an entry from a reduced sparse array.

FIG. 5 is a flow chart describing an example implementation of reading an entry from a reduced-size sparse array. Values in the array can be accessed by applications using identifiers, typically in the form of a positive integer, each of which corresponds to a particular entry in the array. When an identifier I is received 500 from an application, it is determined 502 whether the block containing the entry for this identifier I is empty. For example, if the pointer to its block in the array of block pointers (e.g., 350) is null, then this block is empty. If the block containing the entry I is empty, then a null value is returned 504 for the Ith entry. If the block is non-empty, it is next determined 506 whether the Ith entry is in the range of entries stored for the block. If the Ith entry is not in the range of entries stored for the block, then a null value is returned 508. Otherwise, the value stored in the block for the Ith entry is retrieved 510. This value is returned 512 as the value for the Ith entry. This value still can be null. After returning a value for the Ith entry, the process is completed.

For example, given K entries per block, to retrieve an Ith data item, the quotient I/K, rounded down, is computed to identify the block B containing the Ith data item. If the pointer for block B is null, then null is returned for the Ith entry. Otherwise, the number of empty entries E preceding the stored range of entries is retrieved, and the length L of the range of non-empty entries is retrieved or calculated. If the Ith entry is not in the stored range of entries (e.g., I−(B*K)<E, and I−(B*K)>E+L−1, then the Ith entry is empty, and a null value is returned for the Ith entry. Otherwise, the Ith entry is in the range of non-empty entries. The value for the Ith entry is then retrieved directly from the array (i.e., at offset I−(B*K)−E in the data stored for block B). The value still can be null, but is nonetheless read from the array. Note that this retrieval is independent of the length of the array, and uses a small number of simple computations.

Having now described the functionality of an example implementation, the processing nodes and their components and modules described throughout the specification can be implemented using one or more computing machines, as a combination of one or more computer programs operating on one or more processors using any suitable programming language or languages (C++, C#, java, Visual Basic, LISP, BASIC, PERL, etc.) and/or as a hardware device (e.g., ASIC, FPGA, processor, memory, storage and the like).

An implementation of the method and system of the present invention can be realized in a centralized fashion in one computing machine, or in a distributed fashion where different elements are spread across several interconnected computing machines.

A computing machine uses a combination of processing devices and memory to implement such techniques, such as in a general purpose computer system. A computer program, comprising a set of computer program instructions, when processed by the processing device, controls the computing machine such that it carries out the methods described herein. The present invention can also be embedded in an article of manufacture, which includes a computer readable storage medium on which computer program instructions are encoded, when processed by the processing device, instructs the computing machine to carry out such methods.

In the computing machine, the memory may be volatile, non-volatile or some combination of these two types. The computing machine also may have additional storage, which can be removable and/or non-removable. Computer storage media includes volatile and nonvolatile, removable and non-removable media implemented in any method or technology for storage of information such as computer program instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other addressable medium in which data can be stored in and retrieved from physical storage locations by the computing machine.

Computer program instructions, in the present context, means any expression, in any language, code or notation, of a set of instructions intended to cause a system having an information processing capability to perform a particular function either directly or after either or both of the following a) conversion to another language, code or notation; b) reproduction in a different material form.

This invention can be embodied in other specific forms without departing from the spirit or essential attributes thereof. The foregoing embodiments are therefore to be considered in all respects illustrative, having been presented by way of example only, rather than limiting on the invention described herein.

What is claimed is:

1. A computer-implemented process comprising:
receiving data describing a sparse array, the sparse array having a positive integer number N of sparse array entries, each sparse array entry having an identifier between 1 and N for accessing the sparse array entry, each sparse array entry storing a value related to the identifier for the sparse array entry, wherein the value of each sparse array entry can be null;
allocating an array of pointers to memory locations, with a pointer entry in the array of pointers for each portion of a plurality of portions of the sparse array; and
for each portion of the plurality of portions of the sparse array,
determining if the portion is empty, such that all sparse array entries in the portion have null values;
if the portion is empty, storing a null value in the pointer entry for the portion; and
if the portion is non-empty,
identifying a first non-empty sparse array entry and a last non-empty sparse array entry in the portion,
storing, in memory at a memory location data for the portion, the stored data including:
a range of sparse array entries between and including the first non-empty sparse array entry and the last non-empty sparse array entry in the portion, including null sparse array entries between the first non-empty sparse array entry and the last non-empty sparse array entry,
an offset, from a reference, of the range of stored sparse array entries within the portion, and
a length of the range of stored sparse array entries, and storing the memory location of the stored data in the pointer entry for the portion.

2. The computer-implemented process of claim 1, wherein the sparse array represents a mapping of document numbers to field values.

3. The computer-implemented process of claim 2, further comprising sorting a set of document numbers according to field values mapped to the document numbers as retrieved from the sparse array.

4. The computer-implemented process of claim 2, further comprising:
reading an inverted index, the inverted index mapping values in a field of a record to document numbers in a database application; and
generating the mapping of the document numbers to the field values.

5. The computer-implemented process of claim 4, further comprising sorting a set of document numbers according to field values mapped to the document numbers as retrieved from the sparse array.

6. The computer-implemented process of claim 1, wherein
the sparse array has a plurality of blocks of equal size, wherein each portion is one of the blocks.

7. A computer-implemented process comprising:
accessing information describing a sparse array, the sparse array having a positive integer number N of entries,
wherein for each of the N entries:
the entry has an identifier between 1 and N for accessing the entry,
the entry stores a value related to the identifier for the entry, and
the value of the entry can be null,
wherein the sparse array is stored in memory as a plurality of portions,
wherein for each non-empty portion, data is stored in memory at a memory location including:
a range of entries between and including a first non-empty entry and a last non-empty entry of the portion, including null entries between the first non-empty entry and the last non-empty entry of the portion,
an offset, from a reference, of the range of stored sparse array entries within the portion, and
a length of the range of stored entries of the non-empty portion, and
wherein each portion has a pointer entry in an array of pointers to memory locations, with a null value stored in the pointer entry for any empty portion of the sparse array and with the memory location in the memory, where the data is stored for the portion, stored in the pointer entry for any non-empty portion of the sparse array;
receiving an identifier of an entry in the sparse array;
processing the identifier and the array of pointers to memory locations with a processor to determine if the entry is in an empty portion of the sparse array;
if the entry is in an empty portion of the sparse array, returning a null value as the value for the entry; and
if the entry is in a non-empty portion of the sparse array:

accessing the pointer entry from the array of pointers to memory locations for the non-empty portion to retrieve the memory location for the data stored in the memory for the non-empty portion of the sparse array including the entry, returning a null value for the entry if the entry is not among the stored entries for the portion, and if the entry is among the stored entries for the portion, returning the value stored for the entry.

8. The computer-implemented process of claim 7, wherein the sparse array has a plurality of blocks of equal size, wherein each portion is one of the blocks, each block having a plurality of entries.

9. The computer-implemented process of claim 8, further comprising:

if the entry is in a non-empty block, determining if the entry is in a range of entries stored from the non-empty block; and wherein returning the value for the entry from the stored portion of the array is performed if the entry is in the range of entries stored for the non-empty block.

10. The computer-implemented process of claim 9, further comprising returning a null value if the entry is in a non-empty block and if the entry is not in the range of entries stored from the non-empty block.

11. The computer-implemented process of claim 7, wherein the sparse array represents a mapping of document numbers to field values.

12. The computer-implemented process of claim 11, further comprising sorting a set of document numbers according to field values mapped to the document numbers as retrieved from the sparse array.

13. An article of manufacture, comprising:

a computer readable storage medium including at least one of a memory and a storage device; and computer program instructions encoded on the computer readable storage medium that, when accessed by a processor, instruct the processor to perform a process comprising:

receiving data describing a sparse array, the sparse array having a positive integer number N of entries, each entry having an identifier between 1 and N for accessing the entry, each entry storing a value related to the identifier for the entry, wherein the value of each entry can be null;

allocating an array of pointers to memory locations, with a pointer entry in the array of pointers for each portion of a plurality of portions of the sparse array; and for each portion of the plurality of portions of the sparse array, determining if the portion is empty, such that all entries in the portion have null values;

if the portion is empty, storing a null value in the pointer entry for the portion; and if the portion is non-empty, identifying a first non-empty entry and a last non-empty entry in the portion, storing, in memory at a memory location data for the portion, the stored data including:

a range of entries between and including the first non-empty entry and the last non-empty entry in the portion, including null entries between the first non-empty entry and the last non-empty entry, an offset, from a reference, of the range of stored sparse array entries within the portion, and a length of the range of stored entries, and storing the memory location of the stored data in the pointer entry for the portion.

14. The article of manufacture of claim 13, wherein the sparse array represents a mapping of document numbers to field values.

15. The article of manufacture of claim 13, wherein the sparse array has a plurality of blocks of equal size, wherein each portion is one of the blocks.

16. An article of manufacture, comprising:

a computer readable storage medium including at least one of a memory and a storage device;

computer program instructions encoded on the computer readable storage medium that, when accessed by a processor, instruct the processor to perform a process comprising:

accessing information describing a sparse array, the sparse array having a positive integer number N of entries, wherein for each of the N entries:

the entry has an identifier between 1 and N for accessing the entry, the entry stores a value related to the identifier for the entry, and the value of the entry can be null, wherein the sparse array is stored in memory as a plurality of portions, wherein for each non-empty portion, data is stored in memory at a memory location including:

a range of entries between and including a first non-empty entry and a last non-empty entry of the portion, including null entries between the first non-empty entry and the last non-empty entry of the portion, and an offset, from a reference, of the range of stored sparse array entries within the portion, and a length of the range of stored entries of the non-empty portion, and wherein each portion has a pointer entry in an array of pointers to memory locations, with a null value stored in the pointer entry for any empty portion of the sparse array and with the memory location in the memory, where the data is stored for the portion, stored in the pointer entry for any non-empty portion of the sparse array;

receiving an identifier of an entry in the sparse array;

processing the identifier and the array of pointers to memory locations with a processor to determine if the entry is in an empty portion of the sparse array;

if the entry is in an empty portion of the sparse array, returning a null value as the value for the entry; and if the entry is in a non-empty portion of the sparse array:

accessing the pointer entry from the array of pointers to memory locations for the non-empty portion to retrieve the memory location for the data stored in the memory for the non-empty portion of the sparse array including the entry, returning a null value for the entry if the entry is not among the stored entries for the portion, and if the entry is among the stored entries for the portion, returning the value stored for the entry.

17. The article of manufacture of claim 16, wherein the sparse array has a plurality of blocks of equal size, wherein each portion is one of the blocks, each block having a plurality of entries.

18. The article of manufacture of claim 17, further comprising:
if the entry is in a non-empty block, determining if the entry is in a range of entries stored from the non-empty block; and
wherein returning the value for the entry from the stored portion of the array is performed if the entry is in the range of entries stored for the non-empty block.

19. The article of manufacture of claim 18, further comprising returning a null value if the entry is in a non-empty block and if the entry is not in the range of entries stored from the non-empty block.

20. The computer-implemented process of claim 9, further comprising returning a null value if the entry is in a non-empty block, and if the entry is in the range of entries stored from the non-empty block, and if the entry is empty.

21. The article of manufacture of claim 18, further comprising returning a null value if the entry is in a non-empty block, and if the entry is in the range of entries stored from the non-empty block, and if the entry is empty.

22. The computer-implemented process of claim 1, wherein the reference is a beginning of the array or a beginning of a portion of the array.

\* \* \* \* \*